(12) United States Patent
Takei (10) Patent No.: US 8,920,973 B2
(45) Date of Patent: Dec. 30, 2014

(54) MANUFACTURING METHOD OF POSITIVE ELECTRODE ACTIVE MATERIAL AND POSITIVE ELECTRODE ACTIVE MATERIAL

(75) Inventor: Yuki Takei, Fukushima (JP)

(73) Assignee: Sony Corporation, Tokyo (JP)

( * ) Notice: Subject to any disclaimer, the term of this patent is extended or adjusted under 35 U.S.C. 154(b) by 1069 days.

(21) Appl. No.: 12/629,489

(22) Filed: Dec. 2, 2009

(65) Prior Publication Data

US 2010/0143802 A1 Jun. 10, 2010

(30) Foreign Application Priority Data

Dec. 5, 2008 (JP) ................. P2008-310849

(51) Int. Cl.
| | |
|---|---|
| H01M 4/00 | (2006.01) |
| H01M 4/13 | (2010.01) |
| H01M 6/00 | (2006.01) |
| H01M 10/00 | (2006.01) |
| H01M 4/58 | (2010.01) |
| H01M 2/16 | (2006.01) |
| C23C 14/00 | (2006.01) |
| C23C 14/32 | (2006.01) |
| H01M 4/02 | (2006.01) |
| H01M 4/29 | (2006.01) |
| H01M 10/44 | (2006.01) |
| H01M 4/50 | (2010.01) |
| H01M 4/525 | (2010.01) |
| H01M 4/36 | (2006.01) |
| H01M 4/505 | (2010.01) |

(52) U.S. Cl.
CPC .............. *H01M 4/525* (2013.01); *H01M 4/366* (2013.01); *H01M 4/505* (2013.01); *Y02E 60/122* (2013.01)

USPC ........ 429/223; 429/122; 429/218.1; 429/224; 429/247; 204/192.1; 205/60

(58) Field of Classification Search
CPC .... Y02E 60/122; H01M 4/366; H01M 4/505; H01M 4/525
USPC ...................... 429/223, 122, 218.1, 224, 247; 204/192.1; 205/60
See application file for complete search history.

(56) References Cited

U.S. PATENT DOCUMENTS

2003/0207178 A1* 11/2003 Hu et al. ................. 429/232
2007/0218363 A1   9/2007 Paulsen et al.

FOREIGN PATENT DOCUMENTS

| JP | 9-139212 | 5/1997 |
|---|---|---|
| JP | 3244314 | 10/2001 |

(Continued)

OTHER PUBLICATIONS

All About Patents, Patent FAQ {http://www.uspto.gov/smallbusiness/patents/faq_print.html} printed Oct. 9, 2012.*

(Continued)

*Primary Examiner* — Patrick Ryan
*Assistant Examiner* — Aaron Greso
(74) *Attorney, Agent, or Firm* — K&L Gates LLP (57) ABSTRACT

A positive electrode active material for nonaqueous electrolyte secondary batteries includes a coating layer containing at least nickel (Ni) and/or manganese (Mn) on the surface of a complex oxide particle containing lithium (Li) and cobalt (Co), wherein a binding energy value obtained by analysis of a surface state by an ESCA surface analysis on the surface of the coating layer is 642.0 eV or more and not more than 642.5 eV in an Mn2p3 peak, and a peak interval of Co—Mn is 137.6 eV or more and not more than 138.0 eV.

8 Claims, 3 Drawing Sheets

(56) References Cited

FOREIGN PATENT DOCUMENTS

| | | | |
|---|---|---|---|
| JP | 2001-328814 | 11/2001 | |
| JP | 2001-328815 | 11/2001 | |
| JP | 3301931 | 4/2002 | |
| JP | 3424851 | 5/2003 | |
| JP | 3571671 | 7/2004 | |
| JP | 2005-044801 | 2/2005 | |
| JP | 2005-44801 | 2/2005 | |
| JP | 3835266 | 8/2006 | |
| JP | 2006-331939 | * 12/2006 | ............ H01M 4/58 |
| JP | 2006-331943 | 12/2006 | |
| JP | 2007-066745 | 3/2007 | |
| JP | 2007-103306 | 4/2007 | |
| JP | 2007-273441 | 10/2007 | |
| JP | 2008-218126 | 9/2008 | |
| JP | 2009-530223 | 8/2009 | |

OTHER PUBLICATIONS

USPTO Partial Translation JP 2006331939.*

Japanese Office Action issued May 17, 2011, for corresponding Japanese Patent Appln. No. 2008-310849.

* cited by examiner

MANUFACTURING METHOD OF POSITIVE ELECTRODE ACTIVE MATERIAL AND POSITIVE ELECTRODE ACTIVE MATERIAL

CROSS REFERENCES TO RELATED APPLICATIONS

The present application claims priority to Japanese Priority Patent Application JP 2008-310849 filed in the Japan Patent Office on Dec. 5, 2008, the entire contents of which is hereby incorporated by reference.

BACKGROUND

The present application relates to a positive electrode active material which is used for a nonaqueous electrolyte secondary battery. In particular, the present application relates to a method for manufacturing a positive electrode active material capable of suppressing the generation of a gas in the inside of a battery and a positive electrode active material.

In recent years, because of conspicuous development of portable electronic technologies, electronic appliances such as mobile phones and laptop personal computers have been recognized as a fundamental technology for supporting the highly computerized society. Also, research and development regarding high functionalization of these electronic appliances are being energetically advanced, and power consumption of these electronic appliances increases steadily in proportion thereto. On the other hand, these electronic appliances are required to be driven for a long period of time, and densification of high energy of a secondary battery which is a drive power source has been inevitably desired.

Also, from the viewpoints of occupied volume and mass of a battery to be built in an electronic appliance, it is desired that the energy density of the battery is as high as possible. At present, a lithium ion secondary battery is built in almost all of appliances because it has an excellent energy density.

As a positive electrode material for lithium ion secondary batteries, a lithium-containing transition metal compound capable of intercalating and deintercalating a lithium ion, or a complex oxide obtained by substituting a part of such a metal element is used. Also, $LiMn_2O_4$ having a spinel structure is widely used because it has a high energy density and a high voltage.

For example, a lithium ion secondary battery uses lithium cobalt oxide for a positive electrode and a carbon material for a negative electrode, respectively and is used at an operating voltage in the range of from 2.5 V to 4.2 V. In a unit cell, the fact that a terminal voltage can be increased to 4.2 V largely relies upon excellent electrochemical stability of a nonaqueous electrolyte material, a separator and so on.

Now, in existing lithium ion secondary batteries which operate at 4.2 V at maximum, a positive electrode active material to be used for a positive electrode, such as lithium cobalt oxide, applies a capacity of merely about 60% relative to its theoretical capacity. The lithium ion second battery is desirable to realize high energy density, high reliability and long life. As a method for enhancing these characteristics, especially an energy density of the battery, there is exemplified a method for setting up an upper voltage of charge high.

For achieving this, for example, as disclosed in WO 03/019713, it is theoretically possible to apply the residual capacity by furthering increasing the charge voltage. Actually, it is known that a high energy density is realized by setting up a voltage at the time of charge at 4.25 V or more. When the charge voltage is increased, it is possible to realize a high capacity because a larger amount of lithium is deintercalated and intercalated from a lithium complex oxide which is a positive electrode active material. It is theoretically possible to apply the residual capacity by increasing the charge voltage.

Above all, lithium transition metal complex oxides composed mainly of nickel (Ni) or cobalt (Co), such as $Li_xNiO_2$ ($0<x\le1.0$) and $Li_xCoO_2$ ($0<x\le1.0$) are the most promising from the standpoints of high potential, stability and long life. Of these, positive electrode active materials composed mainly of lithium nickel oxide ($LiNiO_2$) are a positive electrode active material displaying a relatively high potential, have a high charge current capacity and are expected to increase the energy density.

On the other hand, as described previously, in batteries in which the battery voltage is higher than that of existing secondary batteries, a charge and discharge cycle life is lowered, or a high-temperature characteristic is deteriorated. For example, it is considered that lithium nickel complex oxides such as lithium nickel oxide ($LiNiO_2$) or lithium nickel complex oxides obtained by substituting a part of Ni with Co or Mn are high in stability at a high potential as compared with lithium nickel oxide ($LiNiO_2$). However, such lithium nickel complex oxides are disadvantageous for increasing the energy density because their discharge potential or volume density is lowered as compared with lithium nickel oxide ($LiNiO_2$).

Then, in order to stabilize the positive electrode active material composed mainly of lithium nickel oxide ($LiNiO_2$), as disclosed in JP-A-2004-303591, it is proposed to allow a different kind of element, for example, aluminum (Al), magnesium (Mg), zirconium (Zr), titanium (Ti) or the like, to form a solid solution.

Also, as disclosed in JP-A-2000-164214, a construction in which $LiNiO_2$ is used upon being mixed with a small amount of $LiMn_{1/3}Co_{1/3}Ni_{1/3}O_2$ or the like is proposed. Also, as disclosed in JP-A-2002-151078, it is proposed that the surface of lithium cobalt oxide is subjected to surface coating with spinel lithium manganese oxide, spinel lithium titanium oxide or a nickel cobalt complex oxide. Furthermore, as disclosed in JP-A-10-199530, it is proposed to contrive to stabilize active materials by heat treating lithium nickel cobalt oxide in an inert gas without relying upon substitution or coating with a metal element.

SUMMARY

However, following more miniaturization and high functionalization of portable appliances, it is desirable to further improve a positive electrode active material composed of a lithium transition metal complex oxide which is composed mainly of nickel (Ni) and to make the charge current capacity higher. It is also desirable to achieve an enhancement of charge and discharge efficiency by the foregoing improvement of a positive electrode active material.

However, even secondary batteries using a positive electrode active material prepared by each of the methods disclosed in the foregoing patent documents involve such a problem that all of the required battery characteristics cannot be satisfied. Also, following more miniaturization and high functionalization of portable appliances, at present, lithium ion secondary batteries are desired to solve a lowering of the charge and discharge cycle life in the foregoing generally used positive electrode active materials.

In consequence, it is desirable to solve the foregoing problems and to provide a positive electrode active material having a high capacity and an excellent charge and discharge cycle.

According to an embodiment of the present invention, there is provided a positive electrode active material for nonaqueous electrolyte secondary batteries, which includes a coating layer containing at least nickel (Ni) and/or manganese (Mn) on the surface of a complex oxide particle containing lithium (Li) and cobalt (Co), wherein a binding energy value obtained by analysis of a surface state by an ESCA surface analysis on the surface of the coating layer is 642.0 eV or more and not more than 642.5 eV in an Mn2p3 peak, and a peak interval of Co—Mn is 137.6 eV or more and not more than 138.0 eV.

It is preferable that the foregoing positive electrode active material for nonaqueous electrolyte secondary batteries has an average composition represented by the following general formula (1):

$$Li_p Ni_{(1-q-r-s)} Mn_q Co_r M1_s O_{(2-y)} \qquad (1)$$

wherein M1 represents at least one member selected among elements belonging to the Groups 2 to 15 but other than nickel (Ni), manganese (Mn) and cobalt (Co); and p, q, r, s and y represent values falling within the ranges of $0 \le p \le 1.5$, $0 \le q \le 1.0$, $0 \le r \le 1.0$, $0 \le s \le 1.0$ and $-0.10 \le y \le 0.20$, respectively.

Also, it is preferable that a surface coating amount of the coating layer is 0.5 mole % or more and not more than 20 mole % relative to the complex oxide particle.

Also, according to another embodiment of the present invention, there is provided a nonaqueous electrolyte secondary battery including:

a positive electrode including a positive electrode active material having a coating layer containing at least nickel (Ni) and/or manganese (Mn) on the surface of a complex oxide particle containing lithium (Li) and cobalt (Co), wherein a binding energy value obtained by analysis of a surface state by an ESCA surface analysis on the surface of the coating layer is 642.0 eV or more and not more than 642.5 eV in an Mn2p3 peak, and a peak interval of Co—Mn is 137.6 eV or more and not more than 138.0 eV;

a negative electrode;

a separator disposed on the opposing surface between the positive electrode and the negative electrode; and a nonaqueous electrolyte.

In the foregoing non-aqueous electrolyte secondary battery, it is preferable that a charge voltage is 4.25 V or more and not more than 4.55 V.

Also, it is preferable that an average composition of the positive electrode active material included in the positive electrode of the foregoing nonaqueous electrolyte secondary battery is represented by the foregoing general formula (1).

Furthermore, it is preferable that a surface coating amount of the coating layer is 0.5 mole % or more and not more than 20 mole % relative to the complex oxide particle.

In the foregoing positive electrode active material, elution of cobalt (Co) on the surface of the positive electrode active material can be suppressed, and stability of the positive electrode active material in a high voltage state can be enhanced. Also, residual oxygen in the positive electrode active material can be reduced.

According to an embodiment, it is possible to make both a high battery capacity and a high capacity retention rate compatible with each other.

Additional features and advantages are described herein, and will be apparent from the following Detailed Description and the figures.

DETAILED DESCRIPTION

The present application is described in further detail below with reference to the figures according to an embodiment.

Embodiments according to the present invention are hereunder described with reference to the accompanying drawings.

[Positive Electrode Active Material]

A positive electrode active material according to an embodiment of the present invention is configured to include a coating layer containing at least nickel (Ni) and/or manganese (Mn) on the surface of a complex oxide particle containing lithium (Li) and cobalt (Co). A binding energy value obtained by analysis of a surface state by an ESCA (electron spectroscopy for chemical analysis/X-ray photoelectron spectroscopy (XPS)) surface analysis on the surface of the coating layer is 642.0 eV or more and not more than 642.5 eV in an Mn2p3 peak, and a peak interval of Co—Mn is 137.6 eV or more and not more than 138.0 eV.

The ESCA surface analysis was carried out through measurement using an X-ray photoelectron spectroscope, QUANTERA SXM, manufactured by Ulvac-Phi, Inc. The measurement condition for the ESCA surface analysis is as follows. During the ESCA surface analysis, the obtained positive electrode active material was stuck onto an indium (In) metal foil and provided for the measurement.

Measurement unit: X-Ray photoelectron spectroscope, QUANTERA SXM, manufactured by Ulvac-Phi, Inc.

X-Ray source: Monochromatized Al—Kα rays (1486.6 eV)

X-Ray beam diameter: 100 μm

X-Ray output: 25 W

Electron neutralizing condition: To use an electron neutralizing gun and an argon ion gun for neutralization in an "AUTO" mode Pass energy: 112 eV Data capturing intervals: 0.2 eV/step Scanning number: 20 times By the ESCA surface analysis, the state of each of a Co—Mn bond between cobalt and manganese and a Co—Ni bond between cobalt and nickel existing in the positive electrode active material according to the embodiment of the present invention, and the valence of each of Ni, Co and Mn can be evaluated. The binding strength of each of the Co—Mn bond and the Co—Ni bond and the valence of each of Ni, Co and Mn can be evaluated by measuring a peak interval and a peak position, respectively by ESCA.

In an embodiment, the peak interval of Co—Mn obtained through the surface analysis by ESCA is a value obtained by identifying a peak top position of each of Co2p3 and Mn2p3 and taking a difference therebetween. When the valence of an element becomes large, a photoelectron peak is in general shifted to the high binding energy side, and thus, the binding energy value becomes large. In general, an Mn2p3 peak in lithium nickel manganese cobalt oxide has a peak top at around 642 eV. In an embodiment, it is characterized in that the Mn2p3 peak exists at 642.0 eV or more and not more than 642.5 eV. When the Mn2p3 peak exceeds 642.5 eV, since the valence of the element becomes large, in Mn, binding stability in the surroundings of Mn is lowered due to a Jahn-Teller distortion with a decrease in the ion radius. Similarly, in Co2p3, a peak top position varies with the valence of the element. The peak top position of Co2p3 exists at a position of from 778.6 to 780.5 eV, and thus, a peak interval of Co—Mn is about 137 eV.

When the peak position of Co2p3 is shifted to the high energy side, namely a value of the peak interval of Co—Mn becomes large, the amount of trivalent Co increases. Thus, elution of Co is easy to occur at a high charge voltage or at a high temperature, and stability of the active material cannot be enhanced. For that reason, as described previously, in addition to the fact that the Mn2p3 peak exists at 642.0 eV or more and not more than 642.5 eV, it is characterized in that the peak interval of Co—Mn is 137.6 eV or more and not more than 138.0 eV.

The positive electrode active material of the embodiment according to the present invention is, for example, one having an average composition represented by the following general formula (1):

$$Li_pNi_{(1-q-r-s)}Mn_qCo_rM1_sO_{(2-y)} \quad (1)$$

wherein M1 represents at least one member selected among elements belonging to the Groups 2 to 15 but other than nickel (Ni), manganese (Mn) and cobalt (Co); and p, q, r, s and y represent values falling within the ranges of $0 \leq p \leq 1.5$, $0 \leq q \leq 1.0$, $0 \leq r \leq 1.0$, $0 \leq s \leq 1.0$ and $-0.10 \leq y \leq 0.20$, respectively.

In the foregoing general formula (1), the range of p is, for example, $0 \leq p \leq 1.5$. When the value of p is smaller than this range, a layered rock salt structure of the crystal structure which is the root of functions of the positive electrode active material collapses, recharge becomes difficult, and the capacity is largely lowered. When the value of p is larger than this range, lithium is diffused outside the foregoing complex oxide particle, whereby not only an obstacle to the control of basicity in the subsequent treatment step is caused, but finally, an abuse on the promotion of gelation during kneading of a positive electrode paste is caused.

The range of q is, for example, $0 \leq q \leq 1.0$. When the value of q is smaller than this range, the discharge capacity of the positive electrode active material is reduced. When the value of q is larger than this range, stability of the crystal structure of the complex oxide particle is lowered, thereby causing a lowering in the capacity of repetition of charge and discharge of the positive electrode active material and a lowering in the stability.

The range of r is, for example, $0 \leq r \leq 1.0$. When the value of r is smaller than this range, stability of the crystal structure of the complex oxide particle is lowered, thereby causing a lowering in the capacity of repetition of charge and discharge of the positive electrode active material and a lowering in the stability. When the value of r is larger than this range, the discharge capacity of the positive electrode active material is reduced.

The range of s is, for example, $0 \leq s \leq 1.0$. When the value of s is smaller than this range, stability of the crystal structure of the complex oxide particle is lowered, thereby causing a lowering in the capacity of repetition of charge and discharge of the positive electrode active material and a lowering in the stability. When the value of s is larger than this range, the discharge capacity of the positive electrode active material is reduced.

The range of y is, for example, $-0.10 \leq y \leq 0.20$. When the value of y is smaller than this range, stability of the crystal structure of the complex oxide particle is lowered, thereby causing a lowering in the capacity of repetition of charge and discharge of the positive electrode active material and a lowering in the stability. When the value of y is larger than this range, the discharge capacity of the positive electrode active material is reduced.

A surface coating amount of the coating layer is 0.5 mole % or more and not more than 20 mole % relative to the complex oxide particle. When the surface coating amount is less than 0.5 mole %, the coating effect by nickel (Ni), manganese (Mn) or the like is hardly obtainable, and oxidative activity on the surface of the complex oxide particle is not suppressed. Also, when the surface coating amount exceeds 20 mole %, a proportion of the coating layer which does not contribute to a cell reaction in the positive electrode active material increases, and the discharge capacity is lowered.

An average particle size of the positive electrode active material is preferably 2.0 μm or more and not more than 50 μm. When the average particle size is less than 2.0 μm, in pressing the positive electrode active material layer at the time of preparing a positive electrode, the positive electrode active material layer is separated. Also, since the surface area of the positive electrode active material increases, it is necessary to increase the addition amount of a conductive agent or a binder, and an energy density per unit weight is liable to become small. On the other hand, when this average particle size exceeds 50 μm, the particle pierces through the separator, whereby a short circuit is liable to be caused.

[Manufacturing Method of Positive Electrode Active Material]

Next, the manufacturing method of a positive electrode active material according to an embodiment of the present invention is described. As the complex oxide particle, a complex oxide particle containing lithium and cobalt, which is usually available as a positive electrode active material, can be used. A complex oxide particle obtained by breaking secondary particles using a ball mill, a triturator or the like can also be used as the case may be.

The complex oxide particle containing lithium and cobalt, which constitutes the positive electrode active material having a chemical composition represented by the foregoing general formula (1) can be prepared by known techniques. In the embodiment according to the present invention, the complex oxide particle inclusive of lithium cobalt oxide prepared by a known technique is additionally treated as one more step, thereby achieving surface modification. According to this, when such a complex oxide particle is used as the positive electrode material, not only the discharge current capacity is increased, but the charge and discharge efficiency is enhanced.

Specifically, a secondary particle (complex oxide particle) obtained by coagulating primary particles having a layered crystal, which are constituted of, for example, lithium, nickel, cobalt and aluminum and if desired, by substituting a part of cobalt with a small amount of one or two or more kinds of elements selected from the group consisting of manganese, chromium, iron, vanadium, magnesium, titanium, zirconium, niobium, molybdenum, tungsten, copper, zinc, gallium, indium, tin, lanthanum and cerium, is used as the positive electrode active material. After cladding a solution having a cladding component dissolved in a solvent onto this complex oxide particle, the solvent is removed within a short period of time to deposit the cladding component, and the complex oxide particle is further heat treated under an oxidative atmosphere.

As the foregoing cladding component, at least nickel (Ni) or manganese (Mn) is used. In view of the fact that the coating layer containing nickel (Ni) or manganese (Mn) exists on the surface of the positive electrode active material, oxidative properties on the surface of the positive electrode active material can be lowered. According to this, it is possible to make it difficult to cause decomposition of an electrolytic solution on a boundary with the surface of the positive electrode having high oxidative properties and the generation of a gas following this.

In a step of preparing a positive electrode active material, the positive electrode active material according to an embodiment is subjected to a first heat treatment for forming a coating layer and subsequently subjected to a second heat treatment under a nitrogen atmosphere. The treatment temperature in the second heat treatment is regulated such that it is equal to or lower than the treatment temperature in the first heat treatment.

In the second heat treatment under a nitrogen atmosphere, not only residual carbon in the positive electrode active material is reduced, but the valence of each of nickel (Ni), cobalt (Co) and manganese (Mn) on the surface of the coating layer is reduced. By the first heat treatment during providing the coating layer on the complex oxide particle, cobalt (Co) forms a solid solution together with nickel (Ni) and manganese (Mn) and the like, which constitute the coating layer, and thus, it may exist on the surface of the positive electrode active material. By reducing the valence of each of nickel (Ni), cobalt (Co) and manganese (Mn) on the surface of the coating layer, a high-temperature floating characteristic can be enhanced without causing a lowering in the discharge capacity. Also, deterioration of the battery capacity following a charge and discharge cycle can be suppressed.

When the potential of a positive electrode increases, residual oxygen in the positive electrode active material causes the generation of a gas from the positive electrode. For that reason, the second heat treatment is carried out, thereby previously releasing residual carbon in the positive electrode active material as a carbon dioxide gas outside the system. According to this, the generation of a gas in the positive electrode is suppressed. The residual carbon can be measured by the AGK method defined in JIS R9101.

Also, when the heat treatment is carried out under an inert atmosphere, for example, under a nitrogen atmosphere, thereby reducing the valence of each of nickel (Ni), cobalt (Co) and manganese (Mn), the binding state of each of Ni—Co and Mn—Co can be optimized. According to this, it may be considered that elution of cobalt (Co) on the surface of the positive electrode active material can be suppressed, thereby enhancing the stability of the positive electrode active material in a high voltage state.

As described previously, the second heat treatment is a treatment for further modifying the positive electrode active material prepared in the first heat treatment. For that reason, when the treatment temperature of the second heat treatment is higher than the treatment temperature of the first heat treatment, there is a concern that the positive electrode active material itself is damaged. For that reason, the treatment temperature of the second heat treatment is set up at a temperature of not higher than the treatment temperature of the first heat treatment.

The positive electrode active material is prepared in the following manner.

A compound of nickel (Ni) and/or a compound of manganese (Mn) is dissolved in a solvent system composed mainly of water. Then, a complex oxide particle is dispersed in this solvent system, and a basicity of this dispersion system is increased by, for example, adding a base to the dispersion system, thereby depositing a hydroxide containing nickel (Ni) and/or manganese (Mn) on the surface of the complex oxide particle.

The complex oxide particle having a hydroxide containing nickel (Ni) and/or manganese (Mn) cladded thereon by the cladding treatment is subjected to the first heat treatment. The treatment temperature in the first heat treatment is regulated at about 750° C. or higher and not higher than about 1,000° C. According to this, a coating layer is formed on the surface of the complex oxide particle. By adopting such a method, uniformity of coating on the surface of the complex oxide particle can be enhanced.

As a raw material of the compound of nickel (Ni), an inorganic compound, for example, nickel hydroxide, nickel carbonate, nickel nitrate, nickel fluoride, nickel chloride, nickel bromide, nickel iodide, nickel perchlorate, nickel bromate, nickel iodate, nickel oxide, nickel peroxide, nickel sulfide, nickel sulfate, nickel hydrogensulfate, nickel nitride, nickel nitrite, nickel phosphate, nickel thiocyanate, etc.; or an organic compound, for example, nickel oxalate, nickel acetate, etc. can be used as it is; or it can be used upon being treated with an acid or the like such that it can be dissolved in a solvent system as the need arises.

Also, as a raw material of the compound of manganese (Mn), an inorganic compound, for example, manganese hydroxide, manganese carbonate, manganese nitrate, manganese fluoride, manganese chloride, manganese bromide, manganese iodide, manganese chlorate, manganese perchlorate, manganese bromate, manganese iodate, manganese oxide, manganese phosphinate, manganese sulfide, manganese hydrogensulfide, manganese nitrate, manganese hydrogensulfate, manganese thiocyanate, manganese nitrite, manganese phosphate, manganese dihydrogenphosphate, manganese hydrogencarbonate, etc.; or an organic compound, for example, manganese oxalate, manganese acetate, etc. can be used as it is; or it can be used upon being treated with an acid or the like such that it can be dissolved in a solvent system, if desired.

A pH of the foregoing solvent system composed mainly of water is 12 or more, preferably 13 or more, and more preferably 14 or more. The higher the pH value of the foregoing solvent system composed mainly of water, the more satisfactory the uniformity of cladding of a hydroxide containing nickel (Ni) and manganese (Mn). Also, there are brought advantages such as high reaction precision, enhancement of the productivity due to shortening of the treatment time and enhancement of the quality. Also, the pH of the solvent system composed mainly of water is determined a balance with the cost of an alkali to be used, or the like.

The coating layer may be formed by spraying a solution having the cladding component dissolved in a solvent onto the heated complex oxide particle. By adopting such a method, the solvent in which the cladding component is dissolved can be removed within a short period of time, and the time for which the complex oxide particle comes into contact with the solvent to be contained in the solution can be extremely shortened. In general, when the complex oxide particle comes into contact with the solvent, a lithium ion in the complex oxide particle elutes into the solvent. However, according to the foregoing method, the elution of a lithium ion can be suppressed, and a change in the quality on the surface of the complex oxide particle and a lowering in the capacity of the positive electrode active material following this can be suppressed.

Also, the coating layer may be formed by adopting a so-called dry method. After finely pulverizing a metal compound containing a cladding component by a ball mill, this metal compound powder is mixed with a complex oxide particle, and the metal compound power is cladded on the surface of the complex oxide particle by means of mechanofusion or the like. In addition to the mechanofusion, cladding can be achieved by using a ball mill, a jet mill, a triturator, a pulverizer or the like.

In an embodiment, by pulverizing, mixing and cladding the complex oxide particle and the metal compound to be coated thereon, the whole of the complex oxide particle can be coated with the metal compound in a smaller amount. As a technique for this, in addition to a ball mill, coating can be achieved by using a jet mill, a triturator, a pulverizer or the like.

Subsequently, the complex oxide particle having a coating layer formed thereon is subjected to the second heat treatment under an inert atmosphere, for example, a nitrogen atmosphere, etc. The treatment temperature in the second heat treatment is lower than the treatment temperature in the first heat treatment and is regulated at about 650° C. or higher and not higher than about 950° C. There is thus prepared the positive electrode active material according to an embodiment.

The thus prepared positive electrode active material has very high stability, and a secondary battery provided with a positive electrode using this positive electrode active material has a high capacity and is excellent in a charge and discharge cycle. The secondary battery using the positive electrode active material according to the embodiment of the present invention can, for example, take the following configuration.

(1-1) Embodiment 1 of Nonaqueous Electrolyte Secondary Battery:

[Configuration of Nonaqueous Electrolyte Secondary Battery]

Figure 1:
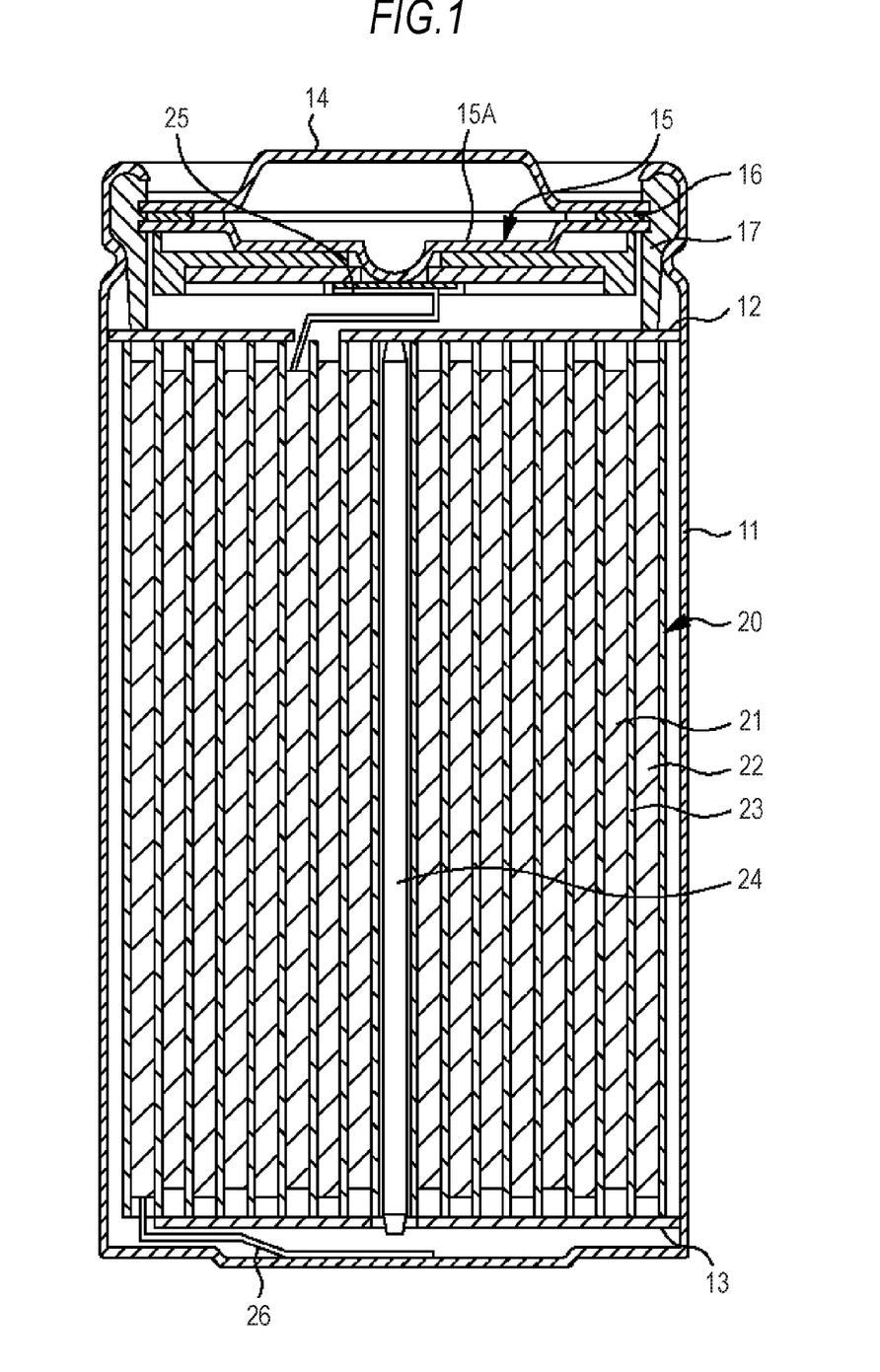
FIG. 1 is a diagrammatic sectional view of Embodiment 1 of a nonaqueous electrolyte secondary battery using a positive electrode active material according to an embodiment of the present invention.

FIG. 1 shows a sectional structure of a nonaqueous electrolyte battery (hereinafter properly referred to as "secondary battery") according to an embodiment of the present invention. This battery is, for example, a lithium ion secondary battery.

As shown in FIG. 1, this battery is of a so-called cylinder type and has a wound electrode body 20 in which a strip-shaped positive electrode 21 and a strip-shaped negative electrode 22 are wound via a separator 23 in the inside of a substantially hollow columnar battery can 11. The battery can 11 is made of, for example, nickel (Ni)-plated iron (Fe), and one end thereof is closed, with the other end being opened. A pair of insulating plates 12 and 13 is disposed in the inside of the battery can 11 vertically against the wound peripheral surface so as to interpose the wound electrode body 20 therebetween.

In the open end of the battery can 11, a battery lid 14 is installed by caulking with a safety valve mechanism 15 and a positive temperature coefficient element (PTC element) 16 provided in the inside of this battery lid 14 via a gasket 17, and the inside of the battery can 11 is hermetically sealed. The battery lid 14 is made of, for example, the same material as that in the battery can 11.

The safety valve mechanism 15 is electrically connected to the battery lid 14 via the positive temperature coefficient element 16. According to this, in the case where the pressure in the inside of the battery reaches a fixed value or more due to an internal short circuit or heating from the outside or the like, a disc plate 15A is reversed, whereby electrical connection between the battery lid 14 and the wound electrode body 20 is disconnected. When the temperature rises, the positive temperature coefficient element 16 controls a current due to an increase of a resistance value, whereby abnormal heat generation to be caused due to a large current is prevented from occurring. The gasket 17 is made of, for example, an insulating material, and asphalt is coated on the surface thereof.

For example, the wound electrode body 20 is wound centering on a center pin 24. A positive electrode terminal 25 made of aluminum (Al), etc. is connected to the positive electrode 21 of the wound electrode body 20; and a negative electrode terminal 26 made of nickel (Ni), etc. is connected to the negative electrode 22. The positive electrode terminal 25 is welded to the safety valve mechanism 15, whereby it is electrically connected to the battery lid 14; and the negative electrode terminal 26 is welded to the battery can 11, whereby it is electrically connected thereto.

Figure 2:
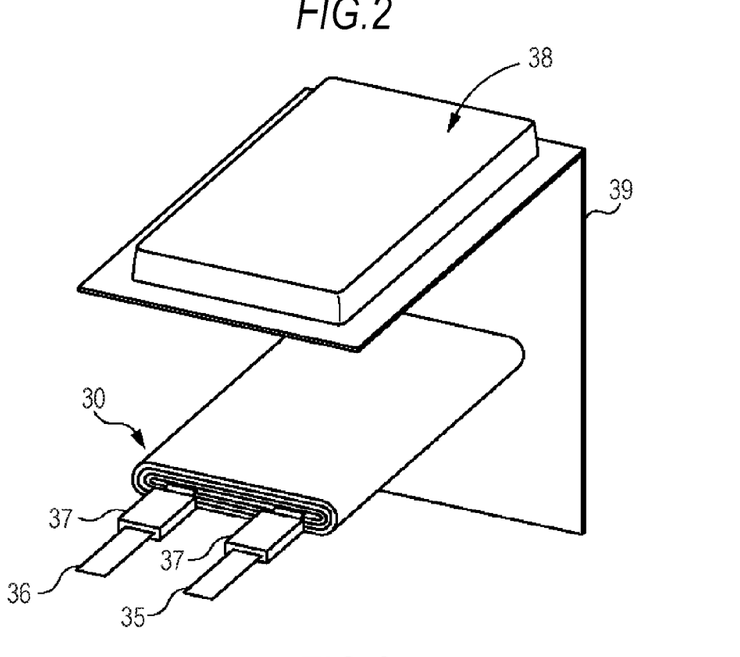
FIG. 2 is a diagrammatic sectional view of Embodiment 2 of a nonaqueous electrolyte secondary battery using a positive electrode active material according to an embodiment of the present invention.

FIG. 2 enlargedly shows a part of the wound electrode body 20 shown in FIG. 1.

[Positive Electrode]

The positive electrode 21 has, for example, a positive electrode collector 21A and a positive electrode active material layer 21B provided on the both surfaces of the positive electrode collector 21A. The positive electrode 21 may be configured to include a region where the positive electrode active material layer 21B exists on only one surface of the positive electrode collector 21A. The positive electrode collector 21A is made of a metal foil, for example, an aluminum (Al) foil, etc.

The positive electrode active layer 21B contains, for example, a positive electrode active material having the constitution as described previously, a conductive agent such as fibrous carbon and carbon black and a binder such as polyvinylidene fluoride (PVdF).

As the conductive agent which is contained in the positive electrode active material layer, fibrous carbon is especially preferable. In view of the fact that the fibrous carbon has a long major axis as compared with a carbon material having a substantially spherical shape, in the case of using the fibrous carbon as a conductive agent, it is possible to reduce the number of contact points between conductive agents each other as compared with the case of using a substantially spherical carbon material. Since the conduct agents are connected to each other with a binder, by reducing the number of contact points, the amount of the binder in a conductive route is reduced, whereby a rise of resistance can be suppressed. For that reason, by using fibrous carbon, it is possible to enhance the conductivity in the thickness direction of the positive electrode active material layer.

As the fibrous carbon, for example, a so-called vapor grown carbon fiber formed by the vapor phase method can be used. The vapor grown carbon fiber can be, for example, manufactured by a method for blowing a vaporized organic compound together with iron which will work as a catalyst under a high-temperature atmosphere. As the vapor grown carbon fiber, all of a material in a manufactured state as it is, a material obtained by heat treatment at from about 800 to 1,500° C. and a material obtained by graphitization at from about 2,000 to 3,000° C. are useful. Above all, a material obtained by heat treatment and further graphitization is preferable because crystallinity of carbon is advanced, and it has high conductivity and high pressure resistance characteristic.

[Negative Electrode]

The negative electrode 22 has, for example, a negative electrode collector 22A and a negative electrode active material layer 22B provided on the both surfaces of the negative electrode collector 22A. The negative electrode 22 may be configured to include a region where the negative electrode active material layer 22B exists on only one surface of the negative electrode collector 22A. The negative electrode collector 22A is made of a metal foil, for example, a copper (Cu) foil, etc.

The negative electrode active material layer 22B contains, for example, a negative electrode active material and may contain other materials which do not contribute to the charge, such as a conductive agent, a binder and a viscosity modifier as the need arises. Examples of the conductive agent include a graphite fiber, a metal fiber and a metal powder. Examples of the conductive agent include fluorine based polymer compounds, for example, polyvinylidene fluoride (PVdF), etc.; and synthetic rubbers, for example, a styrene-butadiene rubber (SBR), an ethylene-propylene-diene rubber (EPDR), etc.

The negative electrode active material is constituted to include one or two or more kinds of negative electrode materials capable of electrochemically intercalating and deintercalating lithium (Li) at a potential of not more than 2.0 V relative to the lithium metal.

Examples of the negative electrode material capable of intercalating and deintercalating lithium (Li) include carbon materials, metal compounds, oxides, sulfides, lithium nitrides such as $LiN_3$, a lithium metal, metals capable of forming an alloy together with lithium and polymer materials.

Examples of the carbon material include hardly graphitized carbon, easily graphitized carbon, graphite, pyrolytic carbons, cokes, vitreous carbons, organic polymer compound baked materials, carbon fibers and active carbon. Of these, examples of the cokes include pitch coke, needle coke and petroleum coke. The organic polymer compound baked material as referred to herein is a material obtained through carbonization by baking a polymer material such as a phenol resin and a furan resin at an appropriate temperature, and a part thereof is classified into hardly graphitized carbon or easily graphitized carbon. Also, examples of the polymer material include polyacetylene and polypyrrole.

Of such negative electrode materials capable of intercalating and deintercalating lithium (Li), those having a charge and discharge potential relatively close to that of the lithium metal are preferable. This is because the lower the charge and discharge potential of the negative electrode 22, the easier the achievement of a high energy density of the battery. Above all, carbon materials are preferable because a change in the crystal structure to be generated at the time of charge and discharge is very small, a high charge and discharge capacity is obtainable, and a satisfactory cycle characteristic is obtainable. Graphite is especially preferable because its electrochemical equivalent is large, and a high energy density is obtainable. Also, hardly graphitized carbon is preferable because an excellent cycle characteristic is obtainable.

Also, examples of the negative electrode material capable of intercalating and deintercalating lithium (Li) include a simple substance of lithium metal; and a simple substance, an alloy or a compound of a metal element or a semi-metal element capable of forming an alloy together with lithium (Li). These substances are preferable because a high energy density is obtainable. In particular, a joint use of such a substance with a carbon material is more preferable because not only a high energy density is obtainable, but an excellent characteristic is obtainable. In this specification, the "alloy" as referred to herein includes, in addition to alloys composed of two or more kinds of metal elements, alloys composed of at least one member of a metal element and at least one member of a semi-metal element. Examples of its texture include a solid solution, a eutectic (eutectic mixture), an intermetallic compound and one in which two or more kinds thereof coexist.

Examples of such a metal element or semi-metal element include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). Examples of such an alloy or compound include those represented by a chemical formula of $Ma_fMb_gLi_h$ or a chemical formula of $Ma_sMc_tMd_u$. In these chemical formulae, Ma represents at least one member of metal elements and semi-metal elements capable of forming an alloy together with lithium; Mb represents at least one member of metal elements and semi-metal elements other than lithium and Ma; Mc represents at least one member of non-metal elements; and Md represents at least one member of metal elements and semi-metal elements other than Ma. Also, the values of f, g, h, s, t and u are values satisfied with the relationships of $f>0$, $g≥0$, $h≥0$, $s>0$, $t>0$ and $u≥0$, respectively.

Above all, a simple substance, an alloy or a compound of a metal element or a semi-metal element belonging to the Group 4B of the short form of the periodic table is preferable; and silicon (Si) or tin (Sn) or an alloy or a compound thereof is especially preferable. These materials may be crystalline or amorphous.

Furthermore, examples of the negative electrode material capable of intercalating and deintercalating lithium include oxides, sulfides and other metal compounds inclusive of lithium nitrides such as $LiN_3$. Examples of the oxide include $MnO_2$, $V_2O_5$, $V_6O_{13}$, NiS and MoS. Besides, examples of oxides having a relatively base potential and capable of intercalating and deintercalating lithium include iron oxide, ruthenium oxide, molybdenum oxide, tungsten oxide, titanium oxide and tin oxide. Examples of the sulfide include NiS and MoS.

[Separator]

As the separator 23, for example, a polyethylene porous film, a polypropylene porous film, a synthetic resin-made nonwoven fabric, etc. can be used. Such a material may be used in a single layer or may be of a laminated structure in which the foregoing material is laminated in plural layers. A nonaqueous electrolytic solution which is a liquid electrolyte is impregnated in the separator 23.

[Nonaqueous Electrolytic Solution]

The nonaqueous electrolytic solution contains a liquid solvent, for example, a nonaqueous solvent such as organic solvents, and an electrolyte salt dissolved in this nonaqueous solvent.

It is preferable that the nonaqueous solvent contains at least one member of cyclic carbonates, for example, ethylene carbonate (EC), propylene carbonate (PC), etc. This is because the cycle characteristic can be enhanced. In particular, what the nonaqueous solvent contains a mixture of ethylene carbonate (EC) and propylene carbonate (PC) is preferable because the cycle characteristic can be more enhanced.

Also, it is preferable that the nonaqueous solvent contains at least one member of chain carbonates such as diethyl carbonate (DEC), dimethyl carbonate (DMC), ethylmethyl carbonate (EMC) and methylpropyl carbonate (MPC). This is because the cycle characteristic can be more enhanced.

It is preferable that the nonaqueous solvent further contains at least one of 2,4-difluoroanisole and vinylene carbonate (VC). This is because 2,4-difluoroanisole is able to improve the discharge capacity; and vinylene carbonate (VC) is able to more enhance the cycle characteristic. In particular, it is more preferable that what the nonaqueous solvent contains a mixture of these materials is more preferable because both the discharge capacity and the cycle characteristic can be enhanced.

The nonaqueous solvent may further contain one or two or more kinds of butylene carbonate, γ-butyrolactone, γ-valerolactone, compounds obtained by substituting a part or all of the hydrogen groups of such a compound with a fluorine group, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropyronitrile, N,N-dimethylformamide, N-methylpyrrolidinone, N-methyloxazolidinone, N,N-dimethylimidazolidinone, nitromethane, nitroethane, sulfolane, dimethyl sulfoxide and trimethyl phosphate.

There may be the case where by using a compound obtained by substituting a part or all of the hydrogen atoms of a substance included in the foregoing nonaqueous solvent group with a fluorine atom, the reversibility of an electrode reaction is enhanced depending upon the electrode to be combined. In consequence, it is possible to properly use such a substance.

As the electrolyte salt, a lithium salt can be used. Examples of the lithium salt include inorganic lithium salts such as lithium hexafluorophosphate ($LiPF_6$), lithium tetrafluoroborate ($LiBF_4$), lithium hexafluoroarsenate ($LiAsF_6$), lithium hexafluoroantimonate ($LiSbF_6$), lithium perchlorate ($LiClO_4$) and lithium tetrachloroaluminate ($LiAlCl_4$); and perfluoroalkanesulfonic acid derivatives such as lithium trifluoromethanesulfonate ($LiCF_3SO_3$), lithium bis(trifluoromethanesulfonyl)imide ($LiN((CF_3SO_2)_2)$), lithium bis(pentafluoroethanesulfonyl)imide ($LiN(C_2F_5SO_2)_2$) and lithium tris(trifluoromethanesulfonyl)methide ($LiC(CF_3SO_2)_3$). These materials can be used singly or in combinations of two or more kinds thereof. Above all, lithium hexafluorophosphate ($LiPF_6$) is preferable because not only high ionic conductivity can be obtained, but the cycle characteristic can be enhanced.

[Preparation Method of Nonaqueous Electrolyte Secondary Battery]

This secondary battery can be, for example, manufactured in the manner as described below. First of all, for example, a positive electrode active material, low crystalline carbon, a conductive agent and a binder are mixed to prepare a positive electrode mixture; and this positive electrode mixture is dispersed in a solvent such as N-methylpyrrolidone to form a positive electrode mixture slurry. Subsequently, this positive electrode mixture slurry is coated on the positive electrode collector 21A, and after drying the solvent, the resultant is subjected to compression molding by a roll press or the like, thereby forming the positive electrode active material 21B. There is thus prepared the positive electrode 21.

Also, for example, a negative electrode active material and a binder are mixed to prepare a negative electrode mixture, and this negative electrode mixture is dispersed in a solvent such as N-methylpyrrolidone to form a negative electrode mixture slurry. Subsequently, this negative electrode mixture slurry is coated on the negative electrode collector 22A, and after drying the solvent, the resultant is subjected to compression molding by a roll press or the like, thereby forming the negative electrode active material 22B. There is thus prepared the negative electrode 22.

Subsequently, the positive electrode terminal 25 is installed in the positive electrode collector 21A by means of welding, etc., and the negative electrode terminal 26 is also installed in the negative electrode collector 22A by means of welding, etc. Thereafter, the positive electrode 21 and the negative electrode 22 are wound via the separator 23; a tip of the positive electrode terminal 25 is welded to the safety valve mechanism 15. A tip of the negative electrode terminal 26 is then welded to the battery can 11, thereby housing the wound positive electrode 21 and the negative electrode 22 in the inside of the battery can 11 while being interposed between the pair of the insulating plates 12 and 13.

After housing the positive electrode 21 and the negative electrode 22 in the inside of the battery can 11, the foregoing electrolytic solution is injected into the inside of the battery can 11 and impregnated in the separator 23. Thereafter, the battery lid 14, the safety valve mechanism 15 and the positive temperature coefficient element 16 are fixed to the open end of the battery can 11 via the gasket 17 by caulking. There can be thus manufactured the secondary battery shown in FIG. 1.

(1-2) Embodiment 2 of Nonaqueous Electrolyte Secondary Battery:

[Configuration of Nonaqueous Electrolyte Secondary Battery]

FIG. 2 shows a structure of a nonaqueous electrolyte secondary battery using the positive electrode active material according to an embodiment. As shown in FIG. 2, this nonaqueous electrolyte secondary battery is one in which a battery element 30 is housed in an armoring material 39 made of a moistureproof laminated film, and the surroundings of the battery element 30 are sealed by means of welding. The battery element 30 is provided with a positive electrode terminal 35 and a negative electrode terminal 36, and these terminals are interposed by the armoring material 39 and drawn out toward the outside. For the purpose of enhancing the adhesiveness to the armoring material 39, an adhesive film 37 is coated on the both surfaces of each of the positive electrode terminal 35 and the negative electrode terminal 36.

The armoring material 39 has, for example, a laminated structure in which an adhesive layer, a metal layer and a surface protective layer are successively laminated. The adhesive layer is made of a polymer film. Examples of a material which constitutes this polymer film include polypropylene (PP), polyethylene (PE), cast polypropylene (CPP), linear low density polyethylene (LLDPE) and low density polyethylene (LDPE). The metal layer is made of a metal foil. Examples of a material which constitutes this metal foil include aluminum (Al). Also, as the material which constitutes the metal foil, for example, metals other than aluminum (Al) are useful. Examples of a material which constitutes the surface protective layer include nylon (Ny) and polyethylene terephthalate (PET). The surface on the side of the adhesive layer is a surface on the side for housing the battery element 30 therein.

Figure 3:
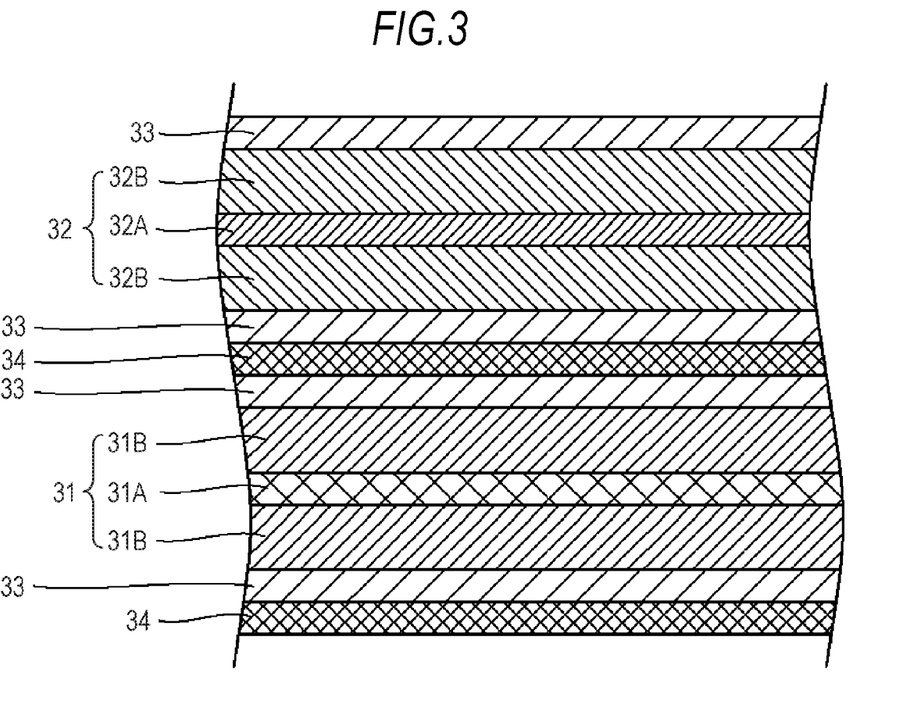
FIG. 3 is an enlarged sectional view of a part of the battery element shown in FIG. 2.

As shown in FIG. 3, the battery element 30 is, for example, a winding type battery element 30 in which a strip-shaped negative electrode 32 having a gel electrolyte layer 33 provided on the both surfaces thereof, a separator 34, a strip-shaped positive electrode layer 31 having a gel electrolyte layer 33 provided on the both surfaces thereof and a separator 34 are laminated, and the laminate is wound in the longitudinal direction.

The positive electrode 31 is composed of a strip-shaped positive electrode collector 31A and a positive electrode mixture layer 31B formed on the both surfaces of this positive electrode collector 31A.

In one end of the positive electrode 31 in the longitudinal direction, the positive electrode terminal 35 which is connected by means of, for example, spot welding or ultrasonic welding is provided. As a material of this positive electrode terminal 35, a metal, for example, aluminum, etc. can be used.

The negative electrode 32 is composed of a strip-shaped negative electrode collector 32A and a negative electrode mixture layer 32B formed on the both surfaces of this negative electrode collector 32A.

Also, similar to the positive electrode 31, in one end of the negative electrode 32 in the longitudinal direction, the negative electrode terminal 36 which is connected by means of, for example, spot welding or ultrasonic welding is provided. As a material of this negative electrode terminal 36, a metal, for example, copper (Cu), nickel (Ni), etc. can be used.

The positive electrode collector 31A, the positive electrode mixture layer 31B, the negative electrode collector 32A and the negative electrode mixture layer 32B are the same as those in the foregoing Embodiment 1.

The gel electrolyte layer 33 contains an electrolytic solution and a polymer compound which will work as a supporting body for supporting this electrolytic solution and is formed in a so-called gel state. The gel electrolyte layer 33 is preferable because not only high ionic conductivity can be obtained, but the battery can be prevented from the occurrence of liquid leakage. The constitution of the electrolytic solution (namely, liquid solvent and electrolyte salt) is the same as that in Embodiment 1.

Examples of the polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polystyrene and polycarbonate. Of these, polyacrylonitrile, polyvinylidene fluoride, polyhexafluoropropylene and polyethylene oxide are especially preferable from the standpoint of electrochemical stability.

[Manufacturing Method of Nonaqueous Electrolyte Secondary Battery]

Next, the manufacturing method of the nonaqueous electrolyte secondary battery according to Embodiment 2 is described. First of all, a precursor solution containing a solvent, an electrolyte salt, a polymer compound and a mixed solvent is coated on each of the positive electrode 31 and the negative electrode 32, and the mixed solvent is volatilized off to form the gel electrolyte layer 33. The positive electrode terminal 35 is previously installed in an end of the positive electrode collector 31A by means of welding, and the negative electrode terminal 36 is also previously installed in an end of the negative electrode collector 32A by means of welding.

Subsequently, the positive electrode 31 and the negative electrode 32 on each of which is formed the gel electrolyte layer 33 are laminated via the separator 34 to form a laminate, and this laminate is wound in the longitudinal direction to form the winding type battery element 30.

Subsequently, the armoring material 39 composed of a laminated film is subjected to deep drawing to form a recess 38. The electrode device 30 is inserted into this recess 38; an unprocessed portion of the armoring material 39 is turned up in an upper part of the recess 38; and an outer periphery of the recess 38 is then sealed by means of hot welding. There is thus prepared the nonaqueous electrolyte secondary battery according to Embodiment 2.

It is preferable that an upper limit charge voltage of a nonaqueous electrolytic solution battery containing the positive electrode active material according the embodiment of the present invention in at least a part of the positive electrode is 4.20 V or more and not more than 4.80 V, preferably 4.25 V or more and not more than 4.55 V, and more preferably 4.35 V or more and not more than 4.45 V. Also, it is preferable that a lower limit discharge voltage of the foregoing nonaqueous electrolytic solution battery is 2.00 V or more and not more than 3.30 V. Since the positive electrode active material according to the embodiment of the present invention is stable as compared with existing materials, it is possible to suppress the deterioration in the capacity during repletion of charge and discharge. Also, even in the case where the charge voltage is set up higher than that in existing secondary batteries, thereby realizing a high energy density, a satisfactory high-temperature characteristic can be obtained.

According to an embodiment, for example, a coating layer containing at least nickel or manganese on the surface of a complex oxide particle is formed, and the complex oxide particle having a coating layer formed thereon is heat treated. Then, by again performing the heat treatment under an inert atmosphere, a high capacity and an excellent charge and discharge cycle characteristic of a nonaqueous electrolyte secondary battery can be realized. In consequence, the secondary battery according to the embodiment of the present invention can be widely utilized for portable small-sized electronic appliances, for example, video cameras, laptop personal computers, word processors, radio cassette recorders, mobile phones, etc. while utilizing characteristic features of light weight, high capacity and high energy density.

EXAMPLES

Embodiments according to the present application are hereunder specifically described with reference to the following Examples and Comparative Examples, but it should not be construed that the embodiments according to the present invention are limited thereto.

Example 1

First of all, a positive electrode active material was prepared. A lithium cobalt oxide powder having an average composition of $Li_{1.03}CoO_2$ and having an average particle size, as measured by the laser scattering method, of 13 μm was prepared as a complex oxide particle. Also, a precursor powder obtained by mixing a lithium carbonate ($Li_2CO_3$) powder, a nickel hydroxide ($Ni(OH)_2$) powder and a manganese carbonate ($MnCO_3$) powder in a molar ratio of $Li_2CO_3$/Ni(OH)$_2$/MnCO$_3$ of 4/3/1 was prepared as a raw material of a coating layer. Subsequently, to 100 parts by mass of this lithium cobalt oxide ($Li_{1.03}CoO_2$) powder, the precursor powder was added in an amount of 5 parts by mass as reduced into $Li_{0.75}Mn_{0.25}O_2$, and the mixture was stirred and dispersed by using 100 parts by mass of pure water at 25° C. over one hour.

Thereafter, the lithium cobalt oxide ($Li_{1.03}CoO_2$) powder having a cladding component cladding thereon was dried in vacuo at 70° C., thereby forming a precursor layer on the surface of the complex oxide particle. Finally, the complex oxide particle having the precursor layer formed on the surface thereof was subjected to temperature rising at a rate of 3° C./min, held at 900° C. for 4 hours and then cooled step by step, thereby obtaining a positive electrode active material having a coating layer formed thereon. The obtained positive electrode active material was pulverized by an agate mortar and allowed to pass through a mesh at 75 μm.

The obtained positive electrode active material composed of lithium nickel manganese cobalt oxide (average chemical composition analysis value: $Li_{1.03}Ni_{0.0375}Mn_{0.0125}Co_{0.95}O_2$, average particle size: 13 μm) was charged in an alumina crucible vessel and placed in a hermetically sealable tubular furnace. After evacuating the inside of the alumina crucible vessel by a vacuum pump, the alumina crucible vessel was purged with a nitrogen ($N_2$) gas. Subsequently, the positive electrode active material was heat treated under an inert atmosphere by a method in which the temperature was raised at a rate of 2° C./min while adjusting a flow rate of the nitrogen ($N_2$) gas at 1 L/min, and the positive electrode active material was held at 900° C. for 4 hours and then cooled step by step. There was thus obtained the positive electrode active material according to the embodiment of the present invention.

This power was measured for a powder X-ray diffraction pattern with Cu—Kα rays. As a result, with respect to the obtained pattern, only a diffraction peak corresponding to $LiCoO_2$ having a layered rock salt structure and a diffraction peak corresponding to $Li_{1.03}Ni_{0.75}Mn_{0.25}O_2$ were obtained, and any impurity was not confirmed.

Also, the obtained positive electrode active material was subjected to surface analysis by ESCA. As a result, an Mn2p3 peak was 642.31 eV, and a peak interval of Co—Mn was 137.66 eV.

A cylindrical secondary battery was prepared by using the foregoing positive electrode active material.

86% by weight of the positive electrode active material, 10% by weight of graphite as a conductive agent and 4% by weight of polyvinylidene fluoride (PVdF) as a binder were mixed to prepare a positive electrode mixture. Subsequently, this positive electrode mixture was dispersed in N-methyl-2-pyrrolidone as a dispersion medium, thereby forming a positive electrode mixture slurry. This positive electrode mixture slurry was uniformly coated on the both surfaces of a positive electrode collector made of a strip-shaped aluminum foil having a thickness of 20 μm, dried and then subjected to compression molding by a roll press, thereby forming a positive electrode active material layer. There was thus prepared a positive electrode. Subsequently, an aluminum-made positive electrode terminal was installed in a positive electrode collector exposed portion of the positive electrode.

Subsequently, 90% by weight of a pulverized artificial graphite powder as a negative electrode active material and 10% by weight of polyvinylidene fluoride as a binder were mixed to prepare a negative electrode mixture. Furthermore, this negative electrode mixture was dispersed in N-methyl-2-pyrrolidone as a dispersion medium, thereby forming a negative electrode mixture slurry. Subsequently, this negative electrode mixture slurry was uniformly coated on the both surfaces of a negative electrode collector made of a strip-shaped foil having a thickness of 10 μm, dried and then subjected to compression molding by a roll press, thereby forming a negative electrode active material layer. There was thus prepared a negative electrode. Subsequently, a nickel-made negative electrode terminal was installed in a negative electrode collector exposed portion of the negative electrode.

Subsequently, the prepared positive electrode and negative electrode were brought into intimate contact with each other via a 25 μm-thick separator made of a microporous polyethylene film and wound in the longitudinal direction, and a protective tape was stuck onto an outermost peripheral part thereof, thereby preparing a wound body. Subsequently, the wound body was housed in an iron-made battery can having nickel plated thereon such that an insulating plate was disposed on the both surfaces of top and bottom of the wound body.

Subsequently, the negative electrode terminal connected to the negative electrode collector was connected to the bottom of the battery can by means of resistance welding. Also, the positive electrode terminal connected to the positive electrode collector was welded to a protrusion of a safety valve in which electrical continuity with a battery lid was ensured.

On the other hand, as an electrolytic solution, lithium hexafluorophosphate ($LiPF_6$) was dissolved in a concentration of 1 mol/L in a mixed solution of ethylene carbonate (EC) and diethyl carbonate (DEC) in a volume mixing ratio of 1/1, thereby preparing a nonaqueous electrolytic solution.

Finally, after injecting the electrolytic solution into the battery can having the wound body installed therein, the battery lid in which a safety valve, a PTC element and the like were provided was fixed by caulking the battery can via an insulating sealing gasket, thereby preparing a cylindrical secondary battery having an outer diameter of 18 mm and a height of 65 mm.

[Measurement of Initial Capacity]

The thus prepared cylindrical secondary battery was subjected to constant-current charge with a constant current of 1,000 mA under an environment at 23° C. until a battery voltage reached 4.35 V and then charged at a constant voltage of 4.35 V until a total charge time reached 2.5 hours. An initial capacity was found to be 10.8 Wh.

[Measurement of Capacity Retention Rate]

The cylindrical secondary battery after measuring the initial capacity was discharged at a constant current of 800 mA. At a point of time when the battery voltage reached 3.0 V, discharge was finished, and an initial capacity was measured. Also, charge and discharge were repeated under the same condition as that in this charge and discharge cycle, and a discharge capacity at the 100th cycle was measured. A capacity retention rate at the 100th cycle was measured according to an expression: {(discharge capacity at the 100th cycle)/(initial capacity)×100}. The capacity retention rate was found to be 98%.

[60° C. Floating Characteristic Test]

Also, the cylindrical secondary battery was subjected to constant-current charge at a constant current of 1,000 mA in a thermostat set up at 60° C. until a battery voltage reached 4.35 V and then subjected to a constant-voltage charge at 4.35 V. At that time, in the case where a fluctuation of the charge current was observed (leakage of current was generated), its time was determined. The test was carried out for 300 hours. As a result, in Example 1, leakage of current was not generated within the test time.

Example 2

A cylindrical secondary battery was prepared in the same manner as in Example 1, except that the charge voltage of the cylindrical secondary battery was changed to 4.45 V. In Example 2, the initial capacity was 11.2 Wh, and the capacity retention rate was 83%. Leakage of current was not generated within the test time.

Example 3

A cylindrical secondary battery was prepared in the same manner as in Example 1, except that lithium nickel manganese cobalt oxide having an average chemical composition analysis value of $Li_{1.03}Ni_{0.05}Mn_{0.05}Co_{0.9}O_2$ was used as the complex oxide particle and that the charge voltage was changed to 4.45 V. The complex oxide particle had an Mn2p3 peak of 642.17 eV and a peak interval of Co—Mn of 137.92 eV. In Example 3, the initial capacity was 11.0 Wh, and the capacity retention rate was 91%. Leakage of current was not generated within the test time.

Example 4

A cylindrical secondary battery was prepared in the same manner as in Example 1, except that lithium nickel manganese cobalt oxide having an average chemical composition analysis value of $Li_{1.03}Ni_{0.025}Mn_{0.025}Co_{0.95}O_2$ was used as the complex oxide particle and that the charge voltage was changed to 4.45 V. The complex oxide particle had an Mn2p3 peak of 642.15 eV and a peak interval of Co—Mn of 137.94 eV. In Example 4, the initial capacity was 11.2 Wh, and the capacity retention rate was 90%. Leakage of current was not generated within the test time.

Example 5

A cylindrical secondary battery was prepared in the same manner as in Example 1, except that the treatment temperature in the second heat treatment was changed to 750° C. The complex oxide particle had an Mn2p3 peak of 642.22 eV and a peak interval of Co—Mn of 137.77 eV. In Example 5, the initial capacity was 10.8 Wh, and the capacity retention rate was 98%. Leakage of current was not generated within the test time.

Example 6

A cylindrical secondary battery was prepared in the same manner as in Example 1, except that the treatment temperature in the second heat treatment was changed to 750° C. and that the charge voltage of the cylindrical secondary battery was changed to 4.45 V. In Example 6, the initial capacity was 11.2 Wh, and the capacity retention rate was 82%. Leakage of current was not generated within the test time.

Example 7

A cylindrical secondary battery was prepared in the same manner as in Example 1, except that lithium nickel manganese cobalt oxide having an average chemical composition analysis value of $Li_{1.03}Ni_{0.05}Mn_{0.05}Co_{0.9}O_2$ was used as the complex oxide particle, that the treatment temperature in the second heat treatment was changed to 750° C. and that the charge voltage was changed to 4.45 V. The complex oxide particle had an Mn2p3 peak of 642.17 eV and a peak interval of Co—Mn of 137.92 eV. In Example 7, the initial capacity was 11.0 Wh, and the capacity retention rate was 90%. Leakage of current was not generated within the test time.

Example 8

A cylindrical secondary battery was prepared in the same manner as in Example 1, except that lithium nickel manganese cobalt oxide having an average chemical composition analysis value of $Li_{1.03}Ni_{0.025}Mn_{0.25}Co_{0.95}O_2$ was used as the complex oxide particle, that the treatment temperature in the second heat treatment was changed to 750° C. and that the charge voltage was changed to 4.45 V. The complex oxide particle had an Mn2p3 peak of 642.15 eV and a peak interval of Co—Mn of 137.94 eV. In Example 8, the initial capacity was 11.2 Wh, and the capacity retention rate was 89%. Leakage of current was not generated within the test time.

Comparative Example 1

A cylindrical secondary battery was prepared in the same manner as in Example 1, except that the second heat treatment was not carried out. The complex oxide particle had an Mn2p3 peak of 642.69 eV and a peak interval of Co—Mn of 137.40 eV. In Comparative Example 1, the initial capacity was 10.8 Wh, and the capacity retention rate was 94%. Leakage of current was not generated within the test time.

Comparative Example 2

A cylindrical secondary battery was prepared in the same manner as in Example 1, except that the second heat treatment was not carried out and that the charge voltage was changed to 4.45 V. The complex oxide particle had an Mn2p3 peak of 642.69 eV and a peak interval of Co—Mn of 137.40 eV. In Comparative Example 2, the initial capacity was 11.2 Wh, and the capacity retention rate was 56%. Also, at a point of time of elapsing 121 hours from the start of the floating test, leakage of current was generated.

Comparative Example 3

A cylindrical secondary battery was prepared in the same manner as in Example 1, except that lithium nickel manganese cobalt oxide having an average chemical composition analysis value of $Li_{1.03}Ni_{0.05}Mn_{0.05}Co_{0.9}O_2$ was used as the complex oxide particle, that the second heat treatment was not carried out and that the charge voltage was changed to 4.45 V. The complex oxide particle had an Mn2p3 peak of 642.69 eV and a peak interval of Co—Mn of 137.40 eV. In Comparative Example 3, the initial capacity was 11.0 Wh, and the capacity retention rate was 64%. Also, at a point of time of elapsing 63 hours from the start of the floating test, leakage of current was generated.

Comparative Example 4

A cylindrical secondary battery was prepared in the same manner as in Example 1, except that lithium nickel manganese cobalt oxide having an average chemical composition analysis value of $Li_{1.03}Ni_{0.05}Mn_{0.05}Co_{0.9}O_2$ was used as the complex oxide particle, that the baking atmosphere in the second heat treatment was changed to the air and that the charge voltage was changed to 4.45 V. The complex oxide particle had an Mn2p3 peak of 641.74 eV and a peak interval of Co—Mn of 137.99 eV. In Comparative Example 4, the initial capacity was 11.0 Wh, and the capacity retention rate was 64%. Also, at a point of time of elapsing 95 hours from the start of the floating test, leakage of current was generated.

Comparative Example 5

A cylindrical secondary battery was prepared in the same manner as in Example 1, except that lithium nickel manganese cobalt oxide having an average chemical composition analysis value of $Li_{0.03}Ni_{0.05}Mn_{0.05}Co_{0.9}O_2$ was used as the complex oxide particle, that the treatment temperature in the second heat treatment was changed to 1,000° C. and that the charge voltage was changed to 4.45 V. The complex oxide particle had an Mn2p3 peak of 641.69 eV and a peak interval of Co—Mn of 138.04 eV. In Comparative Example 5, the initial capacity was 11.0 Wh, and the capacity retention rate was 64%. Also, at a point of time of elapsing 193 hours from the start of the floating test, leakage of current was generated.

Comparative Example 6

A cylindrical secondary battery was prepared in the same manner as in Example 1, except that the second heat treatment was not carried out and that the charge voltage was changed to 4.20 V. The complex oxide particle had an Mn2p3 peak of 642.69 eV and a peak interval of Co—Mn of 137.40 eV. In Comparative Example 6, the initial capacity was 9.5 Wh, and the capacity retention rate was 99%. Leakage of current was not generated within the test time.

The evaluation results are shown in the following Table 1.

TABLE 1

| | | Second heat treatment | | | Energy value of ESCA surface analysis | | | | | 60° C. floating characteristic | |
|---|---|---|---|---|---|---|---|---|---|---|---|
| | Complex oxide particle | Baking atmosphere | Baking temperature [° C.] | Baking time [hr] | Mn2p3 peak [eV] | Peak interval of Co—Mn [eV] | Charge voltage [V] | Initial capacity [Wh] | Capacity retention rate [%] | Presence or absence of leakage of current | Time of generation [hr] |
| Example 1 | $Li_{1.03}Ni_{0.0375}Mn_{0.0125}Co_{0.95}O_2$ | Under nitrogen atmosphere | 900 | 4 | 642.31 | 137.66 | | | | No | — |
| Example 2 | $Li_{1.03}Ni_{0.0375}Mn_{0.0125}Co_{0.95}O_2$ | Under nitrogen atmosphere | 900 | 4 | 642.31 | 137.66 | 4.45 | 11.2 | 83 | No | — |
| Example 3 | $Li_{1.03}Ni_{0.05}Mn_{0.05}Co_{0.9}O_2$ | Under nitrogen atmosphere | 900 | 4 | 642.17 | 137.92 | 4.45 | 11.0 | 91 | No | — |
| Example 4 | $Li_{1.03}Ni_{0.025}Mn_{0.025}Co_{0.95}O_2$ | Under nitrogen atmosphere | 900 | 4 | 642.15 | 137.94 | 4.45 | 11.2 | 90 | No | — |
| Example 5 | $Li_{1.03}Ni_{0.0375}Mn_{0.0125}Co_{0.95}O_2$ | Under nitrogen atmosphere | 750 | 4 | 642.22 | 137.77 | 4.35 | 10.8 | 98 | No | — |
| Example 6 | $Li_{1.03}Ni_{0.0375}Mn_{0.0125}Co_{0.95}O_2$ | Under nitrogen atmosphere | 750 | 4 | 642.22 | 137.77 | 4.45 | 11.2 | 82 | No | — |
| Example 7 | $Li_{1.03}Ni_{0.05}Mn_{0.05}Co_{0.9}O_2$ | Under nitrogen atmosphere | 750 | 4 | 642.34 | 137.75 | 4.45 | 11.0 | 90 | No | — |
| Example 8 | $Li_{1.03}Ni_{0.025}Mn_{0.025}Co_{0.95}O_2$ | Under nitrogen atmosphere | 750 | 4 | 642.27 | 137.85 | 4.45 | 11.2 | 89 | No | — |
| Comparative Example 1 | $Li_{1.03}Ni_{0.0375}Mn_{0.0125}Co_{0.95}O_2$ | — | — | — | 642.69 | 137.40 | 4.35 | 10.8 | 94 | No | — |
| Comparative Example 2 | $Li_{1.03}Ni_{0.0375}Mn_{0.0125}Co_{0.95}O_2$ | — | — | — | 642.69 | 137.40 | 4.45 | 11.2 | 56 | Yes | 121 |
| Comparative Example 3 | $Li_{1.03}Ni_{0.05}Mn_{0.05}Co_{0.9}O_2$ | — | — | — | 641.83 | 137.84 | 4.45 | 11.0 | 64 | Yes | 63 |
| Comparative Example 4 | $Li_{1.03}Ni_{0.05}Mn_{0.05}Co_{0.9}O_2$ | In the air | 900 | 4 | 641.74 | 137.99 | 4.45 | 11.0 | 60 | Yes | 95 |
| Comparative Example 5 | $Li_{1.03}Ni_{0.05}Mn_{0.05}Co_{0.9}O_2$ | Under nitrogen atmosphere | 1000 | 4 | 641.69 | 138.04 | 4.45 | 10.8 | 75 | Yes | 193 |
| Comparative Example 6 | $Li_{1.03}Ni_{0.0375}Mn_{0.0125}Co_{0.95}O_2$ | — | — | — | 642.69 | 137.40 | 4.20 | 9.5 | 99 | No | — |

Also, other energy values (Co2p3 peak, Ni2p3 peak, peak interval of Co—Ni and peak interval of Mn—Ni) in each of the Examples and Comparative Examples as measured by the ESCA surface analysis are shown in the following Table 2.

TABLE 2

| | Energy value of ESCA surface analyst [eV] | | | | | |
|---|---|---|---|---|---|---|
| | Co2p3 peak | Mn2p3 peak | Ni2p3 peak | Peak interval of Co—Mn | Peak interval of Co—Ni | Peak interval of Mn—Ni |
| Example 1 | 779.97 | 642.31 | 854.88 | 137.66 | 74.91 | 212.57 |
| Example 2 | 779.97 | 642.31 | 854.88 | 137.66 | 74.91 | 212.57 |
| Example 3 | 780.09 | 642.17 | 854.64 | 137.92 | 74.55 | 212.47 |
| Example 4 | 780.09 | 642.15 | 854.75 | 137.94 | 74.66 | 212.60 |
| Example 5 | 779.99 | 642.22 | 854.77 | 137.77 | 74.78 | 212.55 |
| Example 6 | 779.99 | 642.22 | 854.77 | 137.77 | 74.78 | 212.55 |
| Example 7 | 780.09 | 642.34 | 854.82 | 137.75 | 74.73 | 212.48 |
| Example 8 | 780.12 | 642.27 | 854.85 | 137.85 | 74.73 | 212.58 |
| Comparative Example 1 | 780.09 | 642.69 | 855.35 | 137.40 | 75.26 | 212.66 |

TABLE 2-continued

| | Energy value of ESCA surface analyst [eV] | | | | | |
|---|---|---|---|---|---|---|
| | Co2p3 peak | Mn2p3 peak | Ni2p3 peak | Peak interval of Co—Mn | Peak interval of Co—Ni | Peak interval of Mn—Ni |
| Comparative Example 2 | 780.09 | 642.69 | 855.35 | 137.40 | 75.26 | 212.66 |
| Comparative Example 3 | 779.67 | 641.83 | 854.34 | 137.84 | 74.67 | 212.51 |
| Comparative Example 4 | 779.73 | 641.74 | 854.16 | 137.99 | 74.43 | 212.42 |
| Comparative Example 5 | 779.73 | 641.69 | 854.12 | 138.04 | 74.39 | 212.43 |
| Comparative Example 6 | 780.09 | 642.69 | 855.35 | 137.40 | 75.26 | 212.66 |

Figure 4:
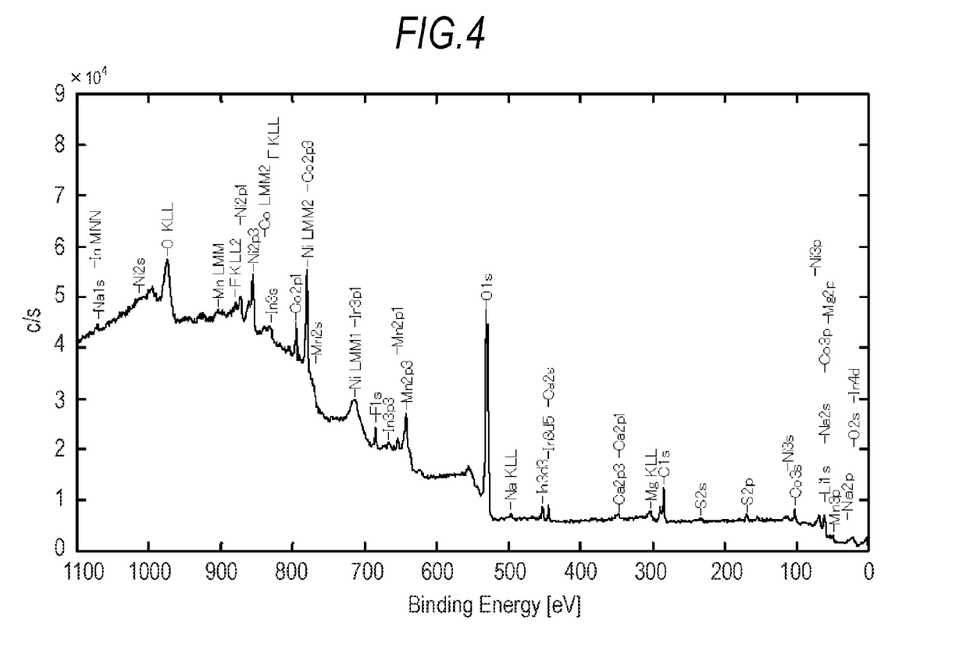
FIG. 4 is an ESCA spectral diagram of $Li_{1.03}Ni_{0.0375}Mn_{0.0125}Co_{0.95}O_2$ used in Examples 1 and 2.
Figure 5:
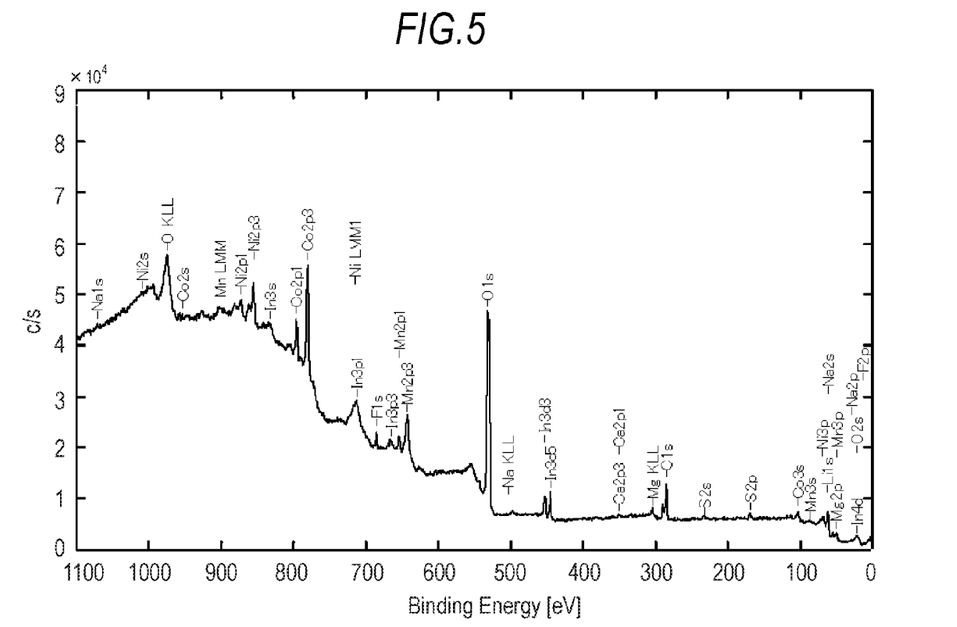
FIG. 5 is an ESCA spectral diagram of $Li_{1.03}Ni_{0.0375}Mn_{0.0125}Co_{0.95}O_2$ used in Comparative Examples 1, 2 and 6, which is not subjected to a second heat treatment under a nitrogen atmosphere.

Also, FIG. 4 is an ESCA spectral diagram of $Li_{0.03}Ni_{0.0375}Mn_{0.0125}Co_{0.95}O_2$ used in Examples 1 and 2. Also, FIG. 5 is an ESCA spectral diagram of $Li_{1.03}Ni_{0.0375}Mn_{0.0125}Co_{0.95}O_2$ used in Comparative Examples 1, 2 and 6, which was not subjected to the second heat treatment under a nitrogen atmosphere.

As is clear from Table 1, in the cylindrical secondary batteries of the respective Examples in which the Mn2p3 peak is 642.0 eV or more and not more than 642.5 eV, and the peak interval of Co—Mn is 137.6 eV or more and not more than 138.0 eV, even in the case of a high charge voltage as 4.35 V or 4.45 V, both the initial capacity and the capacity retention rate could be made compatible with each other.

Also, in the cylindrical secondary batteries of the respective Examples, even in the 60° C. floating characteristic test, leakage of current was not generated. According to this, it was noted that the secondary battery according to the embodiment of the present invention has stable characteristics at a high charge voltage under a high-temperature atmosphere.

As seen in Comparative Examples 1 to 3, in the case of not carrying out the send heat treatment after forming a coating layer, while a high initial capacity could be obtained because of a high charge voltage, the capacity retention rate was lowered as compared with that in the respective Examples at the same charge voltage. With respect to Comparative Examples 2 and 3, it was noted that leakage of current was generated in the 60° C. floating characteristic test, whereby a stable quality was not obtained under a condition at a high charge voltage in a high-temperature environment.

In the case where the second heat treatment was carried out in the air as seen in Comparative Example 4 and in the case where the baking temperature in the second heat treatment was high as 1,000° C. as seen in Comparative Example 5, a high capacity retention rate could not be obtained, too. Also, it was noted that leakage of current was generated in the 60° C. floating characteristic test, whereby a stable quality was not obtained under a condition at a high charge voltage in a high-temperature environment.

On the other hand, in Comparative Example 6, while the second heat treatment was not carried out, a high capacity retention rate could be obtained. However, since the charge voltage was low, the initial capacity was lowered.

In consequence, in the case of using the positive electrode active material according to the embodiment of the present invention, both a high initial capacity and a high capacity retention rate can be made compatible with each other even at a high charge voltage.

It should not be construed that the present invention is limited to the foregoing embodiments, but various modifications and applications can be made within the scope wherein the gist of the present invention is not deviated. For example, the present invention is not particularly limited with respect to its shape, and it may be a cylindrical type or a rectangular type.

The nonaqueous electrolyte secondary battery having an electrolytic solution as the electrolyte has been described in Embodiment 1, and the nonaqueous electrolyte secondary battery having a gel electrolyte as the electrolyte has been described in Embodiment 2. However, it should not be construed that the present application is limited thereto.

For example, in addition to the foregoing electrolytes, a polymer solid electrolyte utilizing an ionic conductive polymer, an inorganic solid electrolyte utilizing an ionic conductive inorganic material and the like can also be used. Such an electrolyte may be used singly or in combinations with other electrolyte. Examples of the polymer compound which can be used for the polymer solid electrolyte include polyethers, polyesters, polyphosphazenes and polysiloxanes. Examples of the inorganic solid electrolyte include ionic conductive ceramics, ionic conductive crystals and ionic conductive glasses.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A positive electrode active material for nonaqueous electrolyte secondary batteries comprising a coating layer containing at least one of nickel and manganese on a surface of a complex oxide particle containing lithium and cobalt, wherein:
    a binding energy value obtained by analysis of a surface state by an ESCA surface analysis on the surface of the coating layer is 642.0 eV or more and not more than 642.5 eV in an Mn2p3 peak, and a peak interval of Co—Mn is 137.6 eV or more and not more than 138.0 eV; and
    the positive electrode active material has an average composition represented by the following general formula (1)

$$Li_pNi_{(1-q-r-s)}Mn_qCo_rM1_sO_{(2-y)} \quad (1)$$

wherein M1 represents at least one member selected among elements belonging to the Groups 2 to 15 but other than nickel, manganese and cobalt; and p, q, r, s and y represent values falling within the ranges of $0 \leq p \leq 1.5$, $0 \leq q \leq 1.0$, $0 \leq r \leq 1.0$, $0 \leq s \leq 1.0$ and $-0.10 \leq y \leq 0.20$, respectively; and wherein the complex oxide particle is subjected to a heat treatment after the coating layer is formed thereon, wherein the heat treatment is performed under an inert atmosphere.

2. The positive electrode active material for nonaqueous electrolyte secondary batteries according to claim 1, wherein a surface coating amount of the coating layer is 0.5 mole % or more and not more than 20 mole % relative to the complex oxide particle.

3. A nonaqueous electrolyte secondary battery comprising:
a positive electrode including a positive electrode active material having a coating layer containing at least one of nickel and manganese on a surface of a complex oxide particle containing lithium and cobalt, wherein:
a binding energy value obtained by analysis of a surface state by an ESCA surface analysis on the surface of the coating layer is 642.0 eV or more and not more than 642.5 eV in an Mn2p3 peak, and a peak interval of Co—Mn is 137.6 eV or more and not more than 138.0 eV;
a negative electrode
a separator disposed on the opposing surface between the positive electrode and the negative electrode; and
a nonaqueous electrolyte, wherein the positive electrode active material has and average composition represented by the following general formula (1)

(1)

wherein M1 represents at least one member selected among elements belonging to the Groups 2 to 15 but other than nickel, manganese and cobalt; and p, q, r, s and y represent values falling within the ranges of $0 \leq p \leq 1.5$, $0 \leq q \leq 1.0$, $0 \leq r \leq 1.0$, $0 \leq s \leq 1.0$ and $-0.10 \leq y \leq 0.20$, respectively; and wherein the complex oxide particle is subjected to a heat treatment after the coating layer is formed thereon, wherein the heat treatment is performed under an inert atmosphere.

4. The nonaqueous electrolyte secondary battery according to claim 3, wherein
a charge voltage is 4.25 V or more and not more than 4.55 V.

5. The nonaqueous electrolyte secondary battery according to claim 4, wherein a surface coating amount of the coating layer is 0.5 mole % or more and not more than 20 mole % relative to the complex oxide particle.

6. The positive electrode active material for nonaqueous electrolyte secondary batteries according to claim 1, wherein the complex oxide particle is subjected to a first heat treatment at a first temperature to form the coating layer, wherein the complex oxide particle is subjected to a second heat treatment at a second temperature after the coating layer is formed thereon, and wherein the second temperature is less than or equal to the first temperature.

7. The positive electrode active material for nonaqueous electrolyte secondary batteries according to claim 6, wherein the complex oxide particle is cooled between the first and second heat treatments.

8. The positive electrode active material for nonaqueous electrolyte secondary batteries according to claim 1, wherein the heat treatment is performed at a temperature of 650° C. to 950° C.

* * * * *